United States Patent [19]

Corral et al.

[11] Patent Number: 4,869,355
[45] Date of Patent: Sep. 26, 1989

[54] HYDRAULICALLY CONTROLLED CLUTCH ACTUATION DEVICE

[75] Inventors: Cecilio M. Corral; Carlos L. Perez; Jose F. Fernandez, all of Madrid, Spain

[73] Assignee: Valeo, Saint-Ouen, France

[21] Appl. No.: 163,802

[22] Filed: Mar. 3, 1988

[30] Foreign Application Priority Data

Mar. 6, 1987 [FR] France .................................. 87 03103

[51] Int. Cl.⁴ .............................................. F16D 19/00
[52] U.S. Cl. .................. 192/98; 192/85 CA; 92/165 PR
[58] Field of Search ............... 192/85 CA, 91 A, 98; 92/165 PR

[56] References Cited

U.S. PATENT DOCUMENTS

| | | | |
|---|---|---|---|
| 4,271,950 | 6/1981 | Kolb et al. | 192/98 |
| 4,585,107 | 4/1986 | Leigh-Monstevens | 192/85 CA |
| 4,687,084 | 8/1987 | Leigh-Monstevens | 192/85 CA |

FOREIGN PATENT DOCUMENTS

| | | |
|---|---|---|
| 0173838 | 12/1986 | European Pat. Off. . |
| 0204663 | 12/1986 | European Pat. Off. . |
| 1346974 | 2/1974 | United Kingdom . |
| 2112490 | 7/1983 | United Kingdom . |
| 2174169 | 10/1986 | United Kingdom . |

Primary Examiner—Leslie A. Braun
Assistant Examiner—Andrea Pitts
Attorney, Agent, or Firm—Charles E. Brown; Charles A. Brown

[57] ABSTRACT

The invention concerns an improvement to the jack of a hydraulically controlled clutch actuation device. The jack which displaces the clutch release bearing is defined between two respective fixed inner and outer cylindrical surfaces external to the sleeve on which the clutch release bearing slides. The space formed between the chamber of the jack and the sleeve also make it possible to house a preloading spring therein.

13 Claims, 2 Drawing Sheets

HYDRAULICALLY CONTROLLED CLUTCH ACTUATION DEVICE

BACKGROUND OF THE INVENTION

1. Field of the Invention

The invention relates to a hydraulically controlled clutch actuation device and in particular to an improvement which provides, among other things, an improvement of the reliability of the overall system and an increased life of the hydraulic jack controlling the displacement of the clutch release bearing.

2. Description of the related art.

Hydraulically controlled clutch systems are known. An actuation device of this kind is generally made up of two main assemblies: the conventional clutch release bearing and a hydraulic jack which acts on the release bearing in order to displace it along the output shaft of the clutch, the bearing being coupled to the actuator of the clutch which in most cases is an annular metal diaphragm. The clutch release bearing is slidably mounted on a fixed sleeve rigid with the gear box and surrounding the input shaft of the latter which is also the clutch output shaft. The jack is arranged around this fixed sleeve and comprises an annular chamber filled with incompressible fluid and a piston, which has an overall tubular and cylindrical shape, coupled to the clutch release bearing. A system of this kind is disclosed, for example, in European Patent Application No. 0 146 283. In this device, the inner surface of the jack chamber is defined by the outer surface of the fixed sleeve which makes it necessary to machine a considerable length of the sleeve. In addition, if oil leaks from the jack it may spread along this fixed sleeve to the clutch itself, which may lead to severe damage. In addition, dirt may infiltrate the chamber, particularly when the fixed sleeve is worn, which may be detrimental to the correct operation of the jack.

The object of the invention is to remedy these drawbacks of the known apparatus.

SUMMARY OF THE INVENTION

For this purpose the invention relates to a hydraulically controlled clutch actuation device of the kind comprising a clutch release bearing which may be displaced along the external wall of a fixed sleeve, and a hydraulic jack acting on this bearing and arranged around the fixed sleeve, and is characterized in that the chamber of the jack is formed in a first annular space bounded between two respective inner and outer cylindrical surfaces, formed by the outer and inner faces of two respective inner and outer tubular sections which are rigid with respect to the sleeve and are both external and coaxial thereto, a piston of the jack comprising a movable cylindrical tubular section which may engage longitudinally in the first annular space forming a movable wall of the said chamber.

An annular safety gap is thus provided which can retain both oil which may have leaked from the jack and dirt from outside. In addition, this free space may be provided with a preloading spring ensuring a permanent contact between the piston of the jack and the clutch release bearing. Previously this spring was often placed externally to the device without any special protection.

DESCRIPTION OF THE PREFERRED EMBODIMENTS

Figure 1:
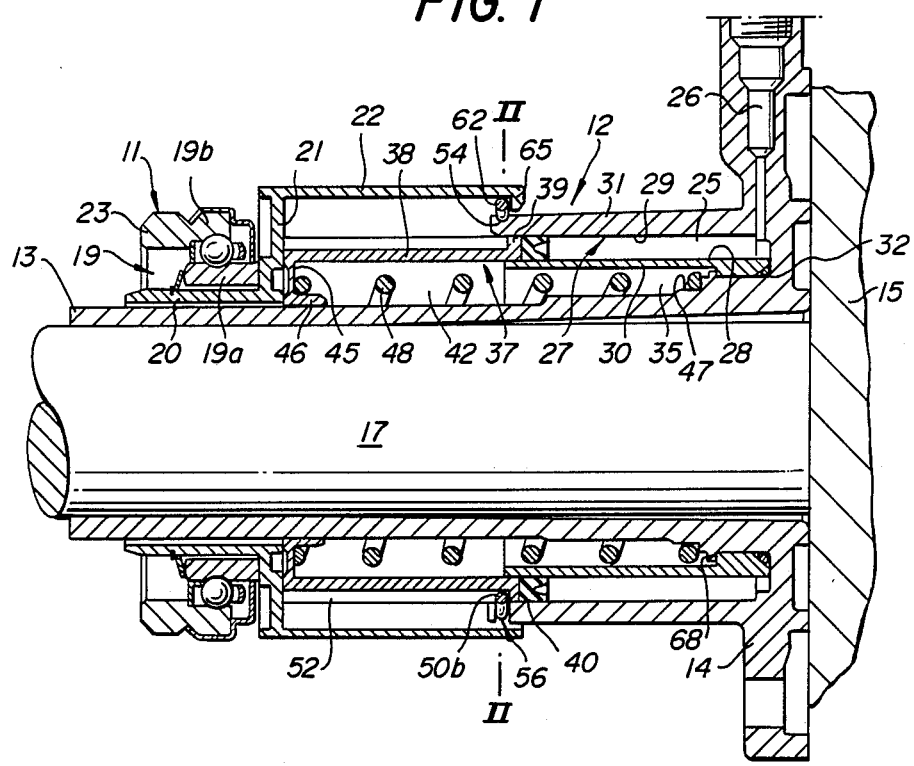
FIG. 1 is a longitudinal section along the line I—I of FIG. 2.

With reference to the drawings, the clutch actuation device shown is chiefly constituted by a clutch release bearing 11 and a hydraulic jack 12. The clutch is not shown. The clutch release bearing 11 and the hydraulic jack 12 are both mounted about a fixed sleeve 13 rigid with the gear box 15 by means of a circular flange 14 or the like. The sleeve 13 surrounds the input shaft 17 of this gear box which is also the output shaft of the clutch. The clutch release bearing 11 of the self-centering type conventionally comprises a ball bearing 19 whose inner race 19a is mounted with a radial clearance on a sliding sleeve 20 which may be displaced along the fixed sleeve 13. On the side of the jack 12, this sliding sleeve is extended by a thrust shoulder 21, perpendicular to its axis, on which the jack 12 acts. The thrust shoulder 21 is itself externally and axially extended by a tubular protection skirt 22 of overall cylindrical shape, whose function will be explained below. The inner race of the ball bearing is supported against the other face of the thrust bearing 21 by a conventional assembly comprising a circlip and a spring forming a Belleville washer. The outer race 19b of the bearing comprises an axial extension 23 orientated towards the clutch (i.e. towards the left in FIG. 1) by means of which the operational connection of the clutch with the actuator (the diaphragm) is provided. In the example shown, the clutch release bearing acts by pushing on the diaphragm by means of its outer race.

The jack 12 comprises a pressure chamber 25 filled with a hydraulic fluid communicating, via a circuit connected to the connector 26, with a hydraulic emitter coupled to a clutch pedal. In accordance with an important feature of the invention, this chamber is defined in a first annular space 27 bounded between an inner cylindrical surface 28 and an outer cylindrical surface 29. The inner cylindrical surface 28 is formed by the outer face of an inner tubular section 30, while the outer cylindrical surface 29 is formed by the inner face of an outer tubular section 31. These two sections are fixed with respect to the sleeve 13 and are both external and coaxial thereto. The outer tubular section 31 is moulded with the sleeve 13 and the flange 14, while the inner tubular section 30 is, in this case, connected in a leak-tight manner to the sleeve 13 by one of its axial ends. It may, for example, be crimped with the interposition of a toric gasket 32 between the end of the section 30 and the base of the moulded component forming the sleeve 13 and the flange 14. The structure may of course be inverted, i.e. the tubular section 31 may be connected while the tubular section 30 is moulded. The two tubular sections may also be either connected or moulded with the flange 14 and the sleeve 13. In addition, the inner tubular section 30 has a greater internal diameter than the external diameter of the sleeve 13 so as to provide a second annular space 35, of constant volume, between the section 30 and the sleeve 13.

In addition, the jack 12 also comprises a piston 37 comprising in particular a movable tubular section 38, of an overall cylindrical shape, which may engage longitudinally in the first annular space 27 and forming, via an end shoulder 39, a movable wall of the chamber 25. The shoulder 39, engaged in the first annular space 27, comprises a lipped gasket 40. This arrangement naturally provides an annular space of variable volume 42 between the inner surface of the tubular section 38 and the sleeve 13. The annular space 42 communicates with the second annular space 35 and is located in the axial extension of the latter. The axial end of the piston opposite to that comprising the end shoulder 39 forming the movable end wall of the chamber 25 is enclosed by a radial annular wall 45 extended by a guide ring 46 sliding on the said sleeve.

The annular wall 45 abuts against the thrust shoulder 21 of the clutch release bearing.

The sleeve 13 is stepped such that it has, on the side opposite to the clutch release bearing, a bearing surface 47 of diameter substantially equal to the external diameter of the guide ring 46.

The preloading spring 48 is housed in the space formed by the second annular space 35 and the annular space of variable volume 42.

The spring 48 is mounted at one of its ends on the guide ring 46 and at its other end on the bearing area 47 and is thus held so that it does not rub against the sleeve 13. The spring 48 ensures the permanent support of the piston 37 against the thrust shoulder 21 of the clutch release bearing which enables an immediate displacement of the bearing in response to actuation of the jack. In addition, the thrust of the piston 37 on the thrust shoulder 21 takes place over a diameter substantially equal to that of the non-rotating ring 19a which ensures improved operation.

It can be clearly seen from the above described arrangement that the housing defined by the second annular space 35 and the annular space of variable volume 42 (which houses the spring 48) provides a double security.

On one hand, if oil manages to escape from the jack through the lipped gasket 40, it penetrates into this housing (35–42) and is no longer subject to the pressure of the hydraulic circuit. It is not then very likely that it can spread up to the clutch facings along the sleeve 13. Moreover, if dirt accumulates during use as a result of wear due to the friction between the sleeves 20 and 13, this dirt will remain in the spring housing and cannot penetrate into the jack chamber.

In addition, while other details are similar, the surface of the piston is greater than in the prior art, since it covers a larger average diameter. The actuating pressure may therefore be lower which again limits he risks of leakage and enables the simplification of the emitter system connected to the clutch pedal.

Moreover, in contrast to known devices in which it is necessary to machine a considerable length of the sleeve 13, in the device of the invention machining is required only in the area of friction between the sleeves 20 and 46 and the sleeve 13.

In addition, the outer tubular section 31 bears at least one inwardly orientated projection, while the movable tubular section 38 of the piston 37 comprises externally at least one corresponding longitudinal groove 52, closed in the vicinity of the chamber 25 (by the presence of the end shoulder 39) and in which the projection is engaged. More precisely, the projection is formed in a stop member 56, shaped overall as the arc of a circle, housed in a circular throat 54 provided in the outer face of the outer tubular section 31. The projection(s) 50a, 50b pass through a corresponding slot 58a, 58b provided in the outer tubular section 31, this slot being in this case a notch communicating with the free circular edge of the outer tubular section. In the example shown, the stop member 56 comprises several projections spaced from one another around the circumference and engaged in respective longitudinal grooves 52 in the movable tubular section 38. This stop member 56 is of pre-shaped metal wire and two projections 50a are formed by the bent ends of this wire. In addition, at least one projection 50b (two projections in the example shown) is formed by a loop of wire orientated radially inwardly. These projections enable the movable tubular section 38 to be made rotationally rigid with respect to the jack 12.

Figure 2:
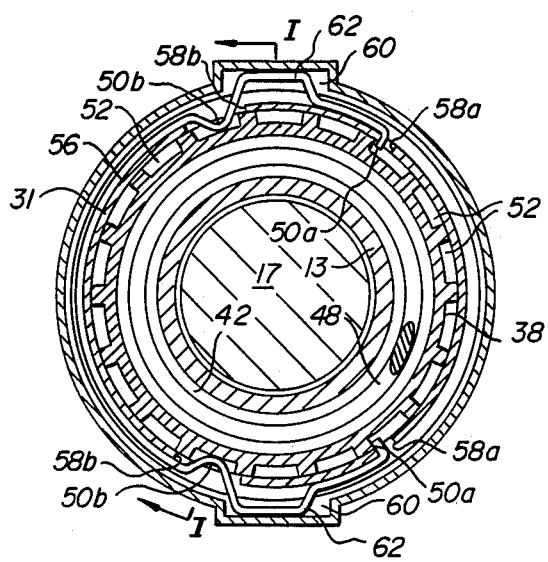
FIG. 2 is a cross-section along the line II—II of FIG. 1.

The projection skirt 22 mentioned above enables the piston to be protected against dirt, whatever the position of the clutch release bearing, i.e. the elongation of the jack. The protection skirt also has a further function. It comprises, for this purpose, on its inner face, two opposite longitudinal grooves 60; while the stop member 56 is shaped to define two outwardly orientated projections 62 which are diametrically opposed and engaged respectively in the grooves 60 of the protection skirt. This ensures that the clutch release bearing is rotationally rigid, i.e. at least its sliding sleeve 20 and the inner housing of the bearing, with respect to the jack 12. Although the clutch release bearing may be rotationally fixed with a single longitudinal groove 60 and one projection 62, it is preferred, as illustrated, to provide two. As a result of the position of the preloading spring 48 in the annular spaces 35 and 42, these outwardly orientated projections 62 can be provided without modifying the dimensions of the control to any substantial extent. In addition, the two outwardly orientated projections 62, are defined, as shown in FIG. 2, by loops of metal wire forming the stop member 56. Finally, the end of each groove 60 of the projection skirt 22 located on the side of the jack 12 is closed by a shoulder 65 against which the corresponding projection 62 can abut to prevent the separation of the clutch release bearing and the hydraulic jack. This is particularly advantageous during maintenance operations requiring the dismantling of the clutch system. The chamber 25 of the jack is filled with fluid in a known manner and pre-vented in the factory such that the whole of the device (supplied therefore with the jack chamber occupying the maximum volume) can be readily connected to the hydraulic circuit of the vehicle.

In operation, the diaphragm of the clutch naturally presses the clutch release bearing back in the direction of the gear box which causes the piston 37 to be pushed back into the chamber 25 when the clutch is in its engaged position. For disengagement the driver controls the increase of pressure in the chamber 25 of the jack which pushes the piston 37 back. As the latter is always in contact with the thrust shoulder 21 of the clutch release bearing, the latter is displaced in the direction causing displacement.

Figure 3:
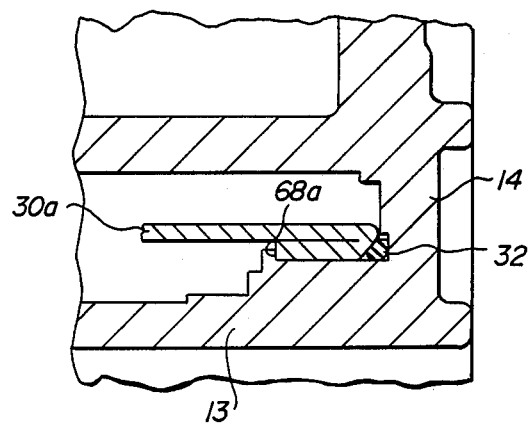
FIGS. 3 to 5 show variants of the crimping of an internal tubular section.
Figure 4:
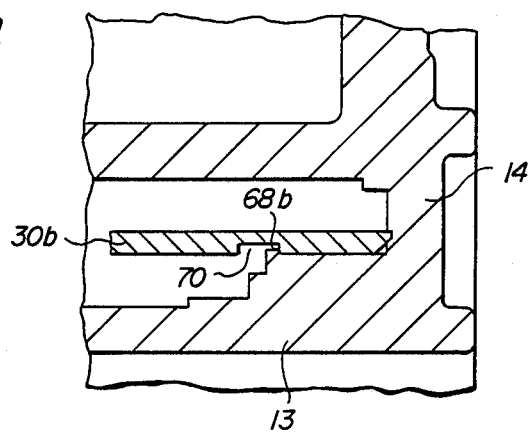
Figure 5:
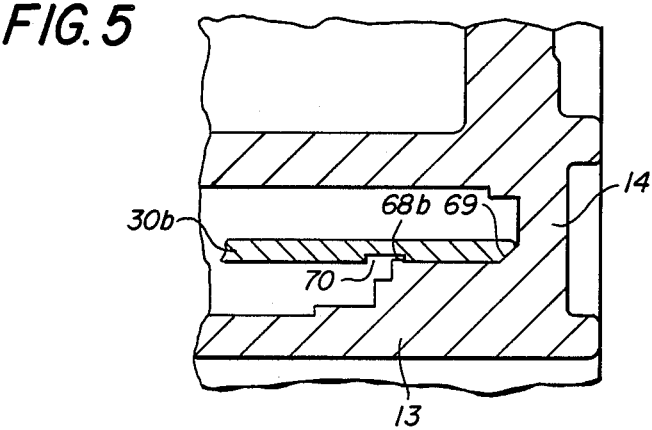

In the embodiment shown in FIGS. 1 and 2, the inner tubular section 30 comprises a thicker walled portion in the vicinity of its fastening end to provide an inner shoulder 68. The crimping operation involves embossing the metal of the sleeve 13 in an axial and annular direction using an appropriate tool. The joint 32 is compressed and deformed in a space cleared by a frustoconical relief provided at the end of the section 30. In the variant of FIG. 3, the extra thickness is provided by folding an end portion of the tubular section 30a over on itself, the end 68a of the internally folded portion forming the shoulder against which crimping is carried out. It is thus possible to produce the inner tubular section from a simple tube without having to machine it to form the shoulder. The folding can be put to good use to define the frustoconical relief against which the joint is applied. In the variant of FIG. 4, the inner tubular section 30b comprises a circular throat 70, one of whose flanks 68b forms the shoulder needed for crimping. The joint is omitted and the crimping takes place such that the end of the section 30b with the frustoconical relief penetrates into the metal of the flange 14 providing adequate leak-tightness. In the case of FIG. 5, the base of the space defined between the sleeve 13 and the flange 14 is provided with a frustoconical bearing area 69 complementary to the relief provided at the end of the section 30b, the latter being identical to that of FIG. 4. Other combinations of the details described with reference to FIGS. 3 to 5 are of course possible and remain within the scope of the invention.

As a variant, it is possible, by separating the sleeve portion 13 from the actual hydraulic jack 12, to obtain a device which can be mounted about any sleeve. The sleeve needed for the application of the hydraulic control of the invention does not require additional machining and can thus advantageously be the same as that used for a conventional mechanical control. It is thus possible in the case of a vehicle whose gearbox is already fitted with the sleeve 13 to use either a mechanical control by associating a clutch fork with the bearing, or a hydraulic control by using a hydraulic jack of the invention.

What is claimed is:

1. A hydraulically controlled clutch actuation device comprising a clutch release bearing adapted to be displaced along the outer wall of a fixed sleeve, and a hydraulic jack acting on this clutch release bearing and disposed about the fixed sleeve, wherein a chamber of the jack is defined in a first annular space bounded between the respective inner and outer cylindrical surfaces formed by the outer and inner faces of two respective inner and outer tubular sections which are fixed with respect to the sleeve and are both external and coaxial thereto, said jack having a piston comprising a movable cylindrical tubular section engaging longitudinally in the said first annular space and forming a movable wall of the said chamber, the fixed inner tubular section having an internal diameter which is greater than the external diameter of the fixed sleeve so as to form a second annular space between this internal tubular section and the sleeve, this second annular space, of constant volume, being extended by an annular space of variable volume bounded between the inner surface of the movable tubular section and said sleeve.

2. A device as claimed in claim 1, wherein the axial end of the piston opposite to the end which forms the movable end wall of the chamber is enclosed by a radial annular wall extended by a guide ring sliding on the fixed sleeve, this radial annular wall abutting against a thrust shoulder on the clutch release bearing.

3. A device as claimed in claim 2, wherein a preloading spring is disposed in the second annular space and extends into the annular space of variable volume, and abuts against the radial annular wall.

4. A device as claimed in claim 3, wherein the thrust bearing forms a radial extension of a sliding sleeve of the clutch release bearing, this sliding sleeve being subject to displacement along the fixed sleeve.

5. A device as claimed in claim 4, wherein the thrust shoulder is extended externally by a protection skirt enveloping the outer tubular section.

6. A hydraulically controlled clutch actuation device comprising a clutch release bearing adapted to be displaced along the outer wall of a fixed sleeve, and a hydraulic jack acting on this clutch release bearing and disposed about the fixed sleeve, wherein a chamber of the jack is defined in a first annular space bounded between the respective inner and outer cylindrical surfaces formed by the outer and inner faces of two respective inner and outer tubular sections which are fixed with respect to the sleeve and are both external and coaxial thereto, said jack having a piston comprising a movable cylindrical tubular section engaging longitudinally in the said first annular space and forming a movable wall of the said chamber, the outer tubular section bearing at least one inwardly oriented projection, and said movable tubular section forming part of the piston comprising externally at least one corresponding longitudinal groove closed in the vicinity of the chamber, and in which said projection is engaged, the outer tubular section comprising externally a circular throat in which is housed a stop member having an arcuate shape overall and which is formed to define at least one said projection passing through a corresponding slot provided in the outer tubular section.

7. A device as claimed in claim 6, wherein said stop member comprises several projections spaced from one another on its circumference and engaged in the respective grooves of the movable tubular section.

8. A device as claimed in claim 7, wherein said stop member is of preshaped metal wire and at least two projections are formed by the bent ends of this wire.

9. A device as claimed in claim 8, wherein said stop member is of preshaped metal wire and at least one projection is formed by a loop of this wire, orientated radially inwardly.

10. A device as claimed in claim 7, wherein a protection skirt comprises at least one longitudinal groove on its inner face and the stop member is shaped to define at least one externally orientated projection engaged in the groove of the skirt to fix the clutch release bearing against rotation.

11. A device as claimed in claim 10, wherein the skirt comprises two opposite grooves in which two diametrically opposed outwardly orientated projections respectively engage.

12. A device as claimed in claim 11, wherein the stop member is of preshaped metal wire and the two outwardly orientated projections are defined by radially outwardly orientated loops of the wire.

13. A device as claimed in claim 10, wherein the end of each groove of the protection skirt located on the side of the hydraulic jack is closed by a shoulder against which the outwardly orientated projection can abut to prevent the separation of the clutch release bearing and the hydraulic jack.

* * * * *